March 20, 1962  E. LORETAN  3,026,155
SHOCK-ABSORBING BEARING FOR THE MOVING
ELEMENT OF A SMALL MECHANISM
Filed March 22, 1960
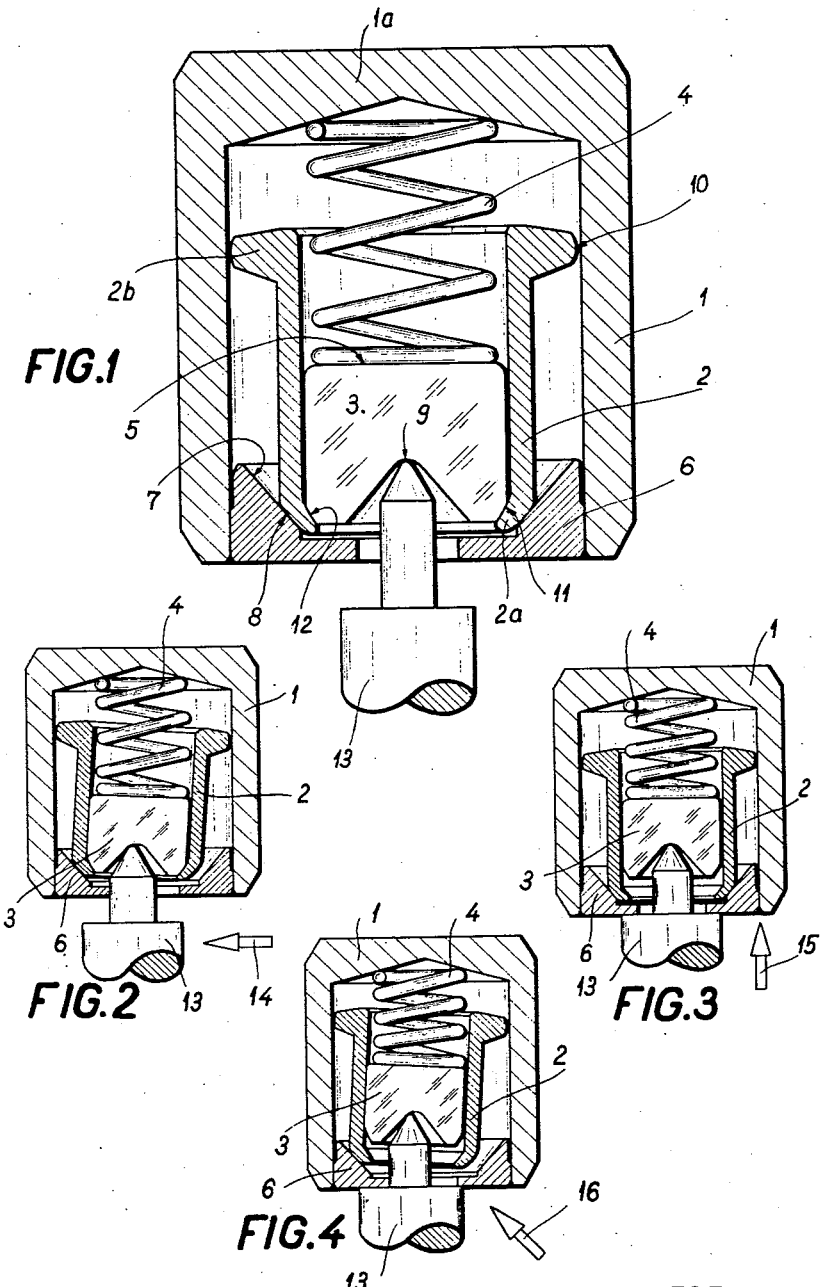
INVENTOR
EDOUARD LORETAN
BY
ATTORNEY

United States Patent Office 3,026,155
Patented Mar. 20, 1962

3,026,155
SHOCK-ABSORBING BEARING FOR THE MOVING ELEMENT OF A SMALL MECHANISM
Edouard Loretan, Le Sentier, Switzerland, assignor to Parechoc S.A., Le Sentier, Switzerland, a firm
Filed Mar. 22, 1960, Ser. No. 16,878
Claims priority, application Switzerland Apr. 23, 1959
6 Claims. (Cl. 308—159)

The present invention relates to a shock-absorbing bearing for the moving element of a small mechanism, comprising a pivot bearing.

The said bearing is characterised in that it comprises a bearing support in an interior recess of which there is disposed, in such manner as to be radially displaceable, a mount for the pivot bearing, the latter being in turn disposed in the said mount in such manner as to be axially displaceable therein and being subjected to the action of a resilient return device also acting, at least indirectly, on the said mount.

A constructional form of the subject of the invention is illustrated by way of example in the drawings.

FIGURE 1 is an axial section through a shock-absorbing bearing, and

FIGURES 2, 3 and 4 are axial sections through the same bearing, to a smaller scale, illustrating the displacements of the movable members of the bearing under the various shocks to which the shaft may be subjected.

The illustrated bearing comprises a support consisting of a sleeve 1 having a rear end member intended to be driven into the frame of the device on which the bearing is mounted. The said sleeve encloses a tubular casing 2 serving as a mount for a pivot bearing 3 and adapted to be laterally displaced in the sleeve. The pivot bearing is mounted in the casing 2 in such manner as to be axially slidable therein. It is maintained against an inner ledge 2a formed on the forward end of the casing 2, by means of a coiled return spring 4 partially lodged in the casing 2 and bearing at one end against the rear face 5 of the pivot bearing 3 and at the other end against the end 1a of the sleeve 1. The latter is in addition provided, at its forward end, with a ring 6 having a frusto-conical seat 7 against which there bears a bearing surface 8 formed of a segment of a spherical surface, at the forward end of the casing 2. The centre of the spherical surface 8 is situated at the point occupied by the end portion 9 of the pivot bearing 3 when the latter is applied against the ledge 2a, so that the bearing remains centered even if the mount 2 is not perfectly aligned on the seat 7.

The rear end of the casing 2 is formed with an outer shoulder 2b, the side face 10 of which is a segment of a spherical surface, which serves for guiding the casing 2 when the latter rocks within the sleeve 1.

In order to widen the manufacturing tolerances, the pivot bearing 3, which consists of ruby, is lodged with slight radial clearance in the casing 2. In order to ensure centering thereof, its forward end is formed with a bearing surface 11 consisting of a segment of a spherical surface having its centre at the point 9 and bearing against a frusto-conical seat 12 formed on the ledge 2a of the casing 2.

When the shaft, which is partially shown and is denoted by 13, is subjected to shocks, the pivot bearing 3 can slide axially in the casing 2 constituting its mount and the latter can rock in the sleeve 1 forming the bearing support. Thus, when the shaft 13 undergoes a purely radial shock in the direction of the arrow 14 of FIGURE 2, for example, the casing 2 rocks in the support 1 without relative displacement of the pivot bearing and of the casing. The return spring 4 thereafter returns the casing to its centered position. When the shaft 13 undergoes a purely axial shock, for example in the direction of the arrow 15 of FIGURE 3, the casing 2 does not move and it is the pivot bearing which slides within the casing. The said pivot bearing is returned into position by the spring 4. Finally, when the shocks undergone by the shaft 13 are both radial and axial, as is generally the case, for example in the direction of the arrow 16 of FIGURE 4, the two movements hereinbefore described are combined so that there are produced both a displacement of the pivot bearing in its mount and a rocking of the said pivot bearing in the bearing support.

The invention is not limited to the embodiment described and illustrated. The end member 1a of the bearing support may consist of a plug fitted in the said support. The latter may have an external screwthread to enable the bearing to be screwed to a variable extent into the frame of the apparatus on which it is mounted.

The bearing according to the invention is applicable to movable elements of small mechanisms such as measuring instruments and meters, as also to movable elements of large timepieces, for example of clocks.

What I claim is:

1. In a shock-absorbing bearing for the movable element of a small mechanism, a bearing support provided with an inner recess, a seat formed by a surface of revolution provided in the neighbourhood of the forward end of the said bearing support, a mount consisting of a casing located in the said recess in such manner as to be radially displaceable therein, an internal ledge of the said casing, a pivot bearing disposed in the said casing in such manner as to be axially displaceable therein, and a resilient return device acting directly on the said pivot bearing for urging it against the said ledge of the said casing and acting through the intermediary of the said pivot bearing on the said casing for urging it on the said seat.

2. In a shock-absorbing bearing for the movable element of a small mechanism, a bearing support provided with an inner recess, a seat formed by a surface of revolution provided in the neighbourhood of the forward end of the said bearing support, a mount consisting of a casing the front end of which is constituted by a segment of spherical surface, said casing being located in the said recess in such manner as to be radially displaceable therein, an internal ledge of the said casing, a pivot bearing disposed in the said casing in such manner as to be axially displaceable therein, and a resilient return device acting directly on the said pivot bearing for urging it against the said ledge of the said casing and acting through the intermediary of the said pivot bearing on the said casing for urging its front end on the said seat.

3. In a shock-absorbing bearing as claimed in claim 2, the feature that the centre of the said spherical surface is situated at the point occupied by the bottom of the said pivot bearing when the latter is maintained against the said internal ledge by the said resilient return device.

4. In a shock-absorbing bearing for the movable element of a small mechanism, a bearing support provided with an inner recess, a seat formed by a surface of revolution provided in the neighbourhood of the forward end of the said bearing support, a mount consisting of a casing located in the said recess in such manner as to be radially displaceable therein, an external shoulder of the said casing, situated in the neighbourhood of its rear end, an internal ledge of the said casing, a pivot bearing disposed in the said casing in such manner as to be axially displaceable therein, and a resilient return device acting directly on the said pivot bearing for urging it against the said ledge of the said casing and acting through the intermediary of the said pivot bearing on the said casing for urging it on the said seat, while its rear end is guided by the said shoulder sliding in the said bearing support.

5. In a shock-absorbing bearing for the movable element of a small mechanism, a bearing support provided with an inner recess, a seat formed by a surface of revolution provided in the neighbourhood of the forward end of the said bearing support, a mount consisting of a casing located in the said recess in such manner as to be radially displaceable therein, an internal ledge of the said casing, a pivot bearing disposed in the said casing in such manner as to be axially displaceable therein, and a coil spring partially lodged in the said casing, acting directly on the said pivot bearing for urging it against the said ledge of the said casing and acting through the intermediary of the said pivot bearing on the said casing for urging it on the said seat.

6. In a shock-absorbing bearing for the movable element of a small mechanism, a bearing support provided with an inner recess, a seat formed by a surface of revolution provided in the neighbourhood of the forward end of the said bearing support, a mount consisting of a casing located in the said recess in such manner as to be radially displaceable therein, an internal ledge of the said casing, provided with a seat, a pivot bearing disposed in the said casing in such manner as to be axially displaceable therein, and a resilient return device acting directly on the said pivot bearing for urging it against the seat of the said ledge and acting through the intermediary of the said pivot bearing on the said casing for urging it on the said seat of the support.

References Cited in the file of this patent

UNITED STATES PATENTS 1,447,587     Calvert _____ Mar. 6, 1926